United States Patent
Meadows

(10) Patent No.: US 7,600,309 B2
(45) Date of Patent: Oct. 13, 2009

(54) SWIMMING POOL TERRAZZO PROCESS

(76) Inventor: Jimmie Frank Meadows, 3400 Bear Canyon Rd., Tucson, AZ (US) 85749

(*) Notice: Subject to any disclaimer, the term of this patent is extended or adjusted under 35 U.S.C. 154(b) by 34 days.

(21) Appl. No.: 11/937,744

(22) Filed: Nov. 9, 2007

(65) Prior Publication Data
US 2009/0119900 A1 May 14, 2009

(51) Int. Cl.
*B23P 25/00* (2006.01)
*E04H 4/00* (2006.01)
*C04B 28/00* (2006.01)

(52) U.S. Cl. .................. 29/458; 29/527.1; 29/527.2; 4/506; 52/741.41; 427/403; 106/639; 106/817

(58) Field of Classification Search ............. 29/458, 29/460, 527.1, 527.2; 4/488, 506, 513; 52/169.7, 52/741.12, 741.14, 741.41; 427/230, 299, 427/355, 368, 403; 106/638, 639, 713, 817, 106/400, 401
See application file for complete search history.

(56) References Cited

U.S. PATENT DOCUMENTS

| | | | |
|---|---|---|---|
| 4,198,472 A * | 4/1980 | Brown | 4/506 |
| 4,748,788 A | 6/1988 | Shaw et al. | |
| 4,906,384 A | 3/1990 | Hamilton | |
| 4,948,296 A * | 8/1990 | Salter | 405/55 |
| 5,605,493 A | 2/1997 | Donatelli et al. | |
| 5,637,144 A | 6/1997 | Whatcott et al. | |
| 5,650,004 A | 7/1997 | Yon | |
| 6,120,698 A | 9/2000 | Rounds et al. | |
| 6,312,604 B1 | 11/2001 | Denkewicz et al. | |
| 6,568,146 B2 * | 5/2003 | Harvey | 52/741.41 |
| 6,596,074 B2 | 7/2003 | Pomeroy | |
| 2002/0063352 A1 | 5/2002 | Torrance | |
| 2007/0144082 A1 * | 6/2007 | Kantor | 52/169.7 |

FOREIGN PATENT DOCUMENTS

JP 2001049825 2/2001

OTHER PUBLICATIONS

Terrazzo- Polished Stone Brochure- US 2006.
Wet Edge Technologies- Marble Blend Brochure- US 2006.
Wet Edge Technologies- Satin Matrix Brochure- US 2006.
Wet Edge Technologies- Pearl Matrix Brochure- US 2006.
Finest Finish- Marble Blend Brochure- US 2006.
Delay S- Conspec Brochure- US 2006.
Aqua Glow- 2 page description and application instructions- US 2006.
Aqua Gems- 11 page web brochure- US 2006.
Aqua Accents- 11 page web brochure- US 2006.
Hydrazzo- Aquavations- brochure- US 2005.

* cited by examiner

*Primary Examiner*—Jermie E Cozart
(74) *Attorney, Agent, or Firm*—Berenato, White & Stavish

(57) ABSTRACT

A method of creating a smooth-to-the-touch Terrazzo pool finish is disclosed. A mixture of 1 part cement to 1-2 parts crushed marble aggregate, ¼ part pool sand, and sufficient potable water, is mixed until smooth and creamy in texture. The mixture is pumped to the gunite shell of a pool interior surface and hand trowelled onto the shell. In a still soft state, the trowelled surface is seeded with colored and/or high performance aggregate to create desired surface effects. The seeded elements are then trowelled into the upper layers of the surface until hard. After an initial set has taken, the surface is sprayed with a chemical retarder. Once fully set, following 10-20 hours of curing, the mixture surface is power-washed and diamond sanded until smooth-to-the-touch and acceptable in appearance in terms of exposing the previously seeded surface effects. The pool is then filled, chemically treated, and brushed until the surface is no longer dust producing.

8 Claims, 2 Drawing Sheets

SWIMMING POOL TERRAZZO PROCESS

FIELD OF THE INVENTION

The invention generally relates to the field of swimming pool plastering. Specifically, the invention relates to the application and finishing of a smooth-to-the-touch pool finish onto an in-place gunite, or other type, pool shell. The pool finish of the present invention is highlighted by colored or performance aggregates that are "seeded" into the upper surface of the interior pool surface finish and exposed by sanding.

BACKGROUND OF THE INVENTION

In the field of man-made pools, many different types of surface finishes exist to create whatever surface effect a pool purchaser is seeking. Popular finishes include a pebble finish made of exposed small aggregate stones and a smoother exposed marble aggregate finish. These surfaces can be color and texture enhanced by virtue of the sand, aggregate and cement colors chosen to create the applied product. These products are available under various tradenames including Terrazzo, Marble Blend, Pearl Matrix, Satin Matrix, Hydrazzo, and Durazzo. Some providers of pool finishing also use aggregate capable of glowing following exposure to sunlight, these include, for example, Aqua-Glow, sold by Colored Aggregate Systems.

In each of these types of exposed aggregate finishes, regardless of the type or nature of the aggregate being exposed, the process is encumbered with the penultimate aggregate exposing part of the process following the application of the mixture to the pool shell. In addition, although the surfaces can be relatively smooth, and especially in the case of the small aggregate exposed pebble finish, the surface can still be quite rough on feet, toes, and scraped limbs of pool users. The same problems exist for the relatively smoother marble aggregate based finishes, but to a lesser extent.

The processes of exposing the aggregate in the exposed aggregate finishes can be time consuming, costly, and a uniform appearance a very difficult result to achieve. In the case of the marble aggregate finish, typically an acid washing step exposes the aggregate. This acid treatment is followed by an acid neutralizing step. Care must be taken to avoid fumes for the workers and streaking of the surface being treated. A thorough brushing of the surface is necessary during the acid wash. Following the acid wash and subsequent neutralizer treatment, the surface is lightly buffed to remove any remaining cement residue that was not removed by the acid wash. Care is to be taken to avoid potential damage to the surface from too rapid drying (high temperature and low humidity and, perhaps, high winds). In certain circumstances a complete pool covering is recommended along with periodic fogging or misting of the surface! Finally, when filling the pool, uninterrupted filling is recommended, and all fill hoses and outlets should be sock covered to avoid marking the new surface, and no direct contact with a hose length is allowed, also to avoid marking.

Another known method of finishing pool interior surfaces involves applying a plaster that includes various selected colored aggregates and, once semi-dried, sanding the surface smooth to expose aggregate. This process is also subject to quality variations owing to the skill of the crew doing the application and sanding. Care has to be taken in the preparation of the mix to obtain the correct and intended texture and colors in successive onsite batches. Additionally, if too much aggregate is present, the mix can be difficult if not impossible to pump from the mixing location to the application site. The application has to be rapid enough to ensure uniformity of the layers and, thereafter, a sanded surface that is relatively uniform in aggregate appearance. In instances where successive batches of plastering mix are not identically prepared or uniformly applied, uneven and unpredictable results can occur with owner dis-satisfaction following therefrom. In addition, owing to the exposure of only the upper surface of the sanded mixture, a considerable amount of the expensive colored aggregate is essentially "wasted" as merely a part of the unseen plastering mix not located immediately proximate the exposed surface. This can be quite expensive inasmuch as some of the performance aggregate can cost upwards of $35.00 per pound.

In the instances where a performance or glow type aggregate has been seeded into the surface, the recommended exposure step is the acid wash, or the use of a retarder, to thereafter expose the "natural" appearance of the aggregate, sharp edges, points and all. As noted previously, this acid wash step is fraught with difficulty and requires considerable expertise to perform. In addition, without sanding the surface remains rough and is thusly hard on user's skin and swim suits, etc.

The prior art pool surfaces are problematic in their application and consistency, expensive, and subject to results that can vary widely from work crew to work crew and jobsite to jobsite.

SUMMARY OF THE INVENTION

The present invention process is directed to an easy-to-apply, smooth-to-the-touch, sanded pool finish that resembles a terrazzo floor covering. A here-to-for unknown combination of steps creates the method.

Firstly, a smooth mixture of 1 part cement to 1-2 parts aggregate is mixed with pool sand and hand trowelled onto a gunite pool shell. As the mixture is being trowelled, seeding or sprinkling of the selected performance aggregate is performed on the surface of the evenly spread plaster mixture. The trowelling continues thereafter until the seeding has just barely been worked into the upper surface of the plastering and the mixture is hardening. The aforesaid seeding operation of the performance aggregate can be done by hand or by a scattering/shooting device to obtain a uniform distribution of the selected aggregate to be sanded and exposed. A chemical horizontal surface retarding agent is sprayed onto the exposed surface of the trowelled finish after it has hardened for 30 minutes to 2 hours, and a plastic covering is placed over the sprinkled surface. Once the material has set for a further 10-20 hours, the surface is repeatedly sanded and power washed to expose the marble aggregate color and texture and/or desired surface effect, and create a smooth-to-the-touch surface. Water injected sanders are used to continuously wash the sanded surface and expose the work area. Once the sanding and washing is finished, the pool is filled, chemically treated, and the surfaced brushed until no further dusting is possible. Additional chemical treatments with either bicarbonate of soda or sulfanic acid may be required as necessary to eliminate precipitation, efflorescence, discoloration, or molting of the finished surface. The need for these additional treatments is usually necessitated owing to the high dissolved chemical and mineral content of the water used to fill the pool. The process is easily accomplished with consistent and effective results from crew to crew and jobsite to jobsite.

The seeding aggregates and materials, worked into the upper surface of the plaster and later exposed by sanding, can include colored marble pebbles and/or can also include a light absorbing performance or "glow-in-the-dark" artificially created aggregate. Unusual effects and patterns can be created that emit light beneath the surface of the pool. Murals using multiple colors can be created. TM's and signage, created using templates, can be trowelled into the surface. 3D effects with multi-layering can be done, as well as safety aspects including highlighting the edge of a step, a shallow water area, depth warnings, ladder locations, etc., are also achievable The trowelled in patterns are exposed by sanding and, owing to the seeding process of the present invention that places the expensive aggregates in only the upper layer of the plaster (as opposed to mixing throughout the plaster mixture), the resulting appearance effects are obtained in a much more cost effective way. The effects obtained are not subject to fading or washing away, and require no power, in the case of glow-in-the-dark applications, in order to light tip repeatedly day after day. In addition, the seeding step avoids the necessity of pumping a highly proportioned aggregate mixture to the pool shell. The higher the aggregate proportion, the more difficult a mixture is to pump and spread. Further, owing to the performance aggregate seeding, as opposed to mixing and pumping, the aggregate can be larger in size and, overall, have a much greater spectrum of sizes from large to small to create a much greater range of appearance than known surfaces made using a pumped mixture only. The addition of the retarding agent also greatly speeds the sanding step and allows for more uniform results in lesser time.

DETAILED DESCRIPTION OF THE PREFERRED EMBODIMENTS

Figure 1:
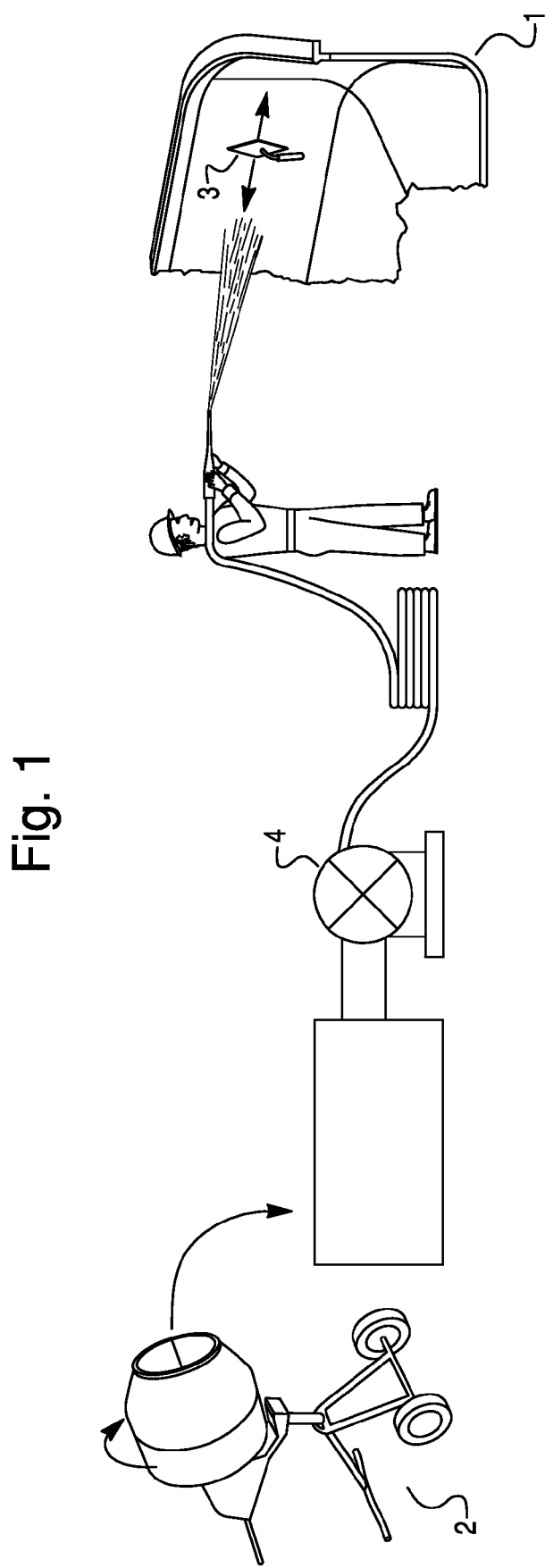
FIG. 1 is a schematic showing the initial steps of and equipment typically used in a process according to the present invention.

In the process according to the present invention a gunite or other plaster ready pool shell 1 is provided. The pool fittings, deck surfaces, and tile are taped with plastic to prevent infiltration from the surfacing mixture and the surface has been thoroughly cleaned of any debris, oils, grease, dirt, algae, paints, sealers, etc.

A mixture is then prepared in a cement mixer 2 for pumping to the interior surfaces of the gunite shell 1. The mixture includes 1 part cement mixed with 1-2 parts marble aggregate, respectively, ranging in size from dust to approximately $1/16$ to $1/4$ inch diameter chunks of crushed marble. The mixture is combined in the cement mixer, (6 cubic foot size is acceptable), with sufficient water until smooth and creamy. Once this texture has been achieved, swimming pool sand is added in a ratio of $1/4$ part to further smooth the mixture. A further 1/10 part cement plasticizer is added to increase mixture flowability. A product sold under the Mat Amax label works well.

A full batch of the mixture may include 400 lbs cement, 400 to 800 lbs of marble aggregate, 40-50 gallons potable water, and 100 lbs swimming pool sand. Each 6 cubic foot batch is mixed 5-7 minutes in the cement mixer 2 and thereafter pumped 4 to the gunite shell 1 and hand trowelled until hard (approximately 4 passes with the trowel 3 are necessary if the mixture has been properly prepared and weather conditions are ideal, i.e., hot and dry (low humidity)). A batch of the foregoing size would cover approximately 200 square feet of gunite pool shell 1.

Figure 2:
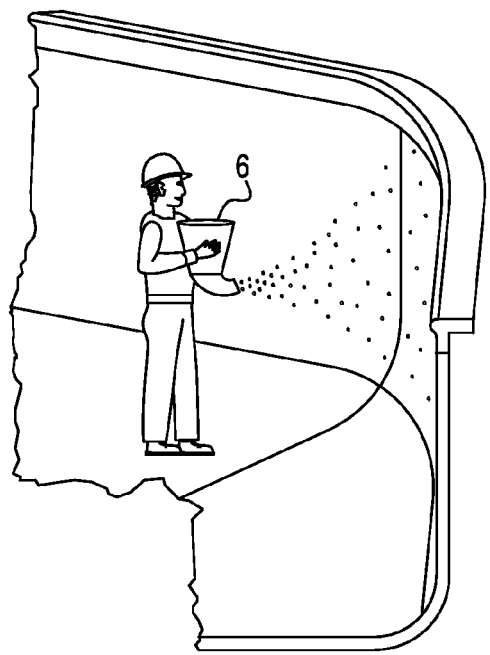
FIG. 2 shows the seeding operation where selected aggregates are machine seeded onto and trowelled into the upper surfaces of the plaster coating.
Figure 3:
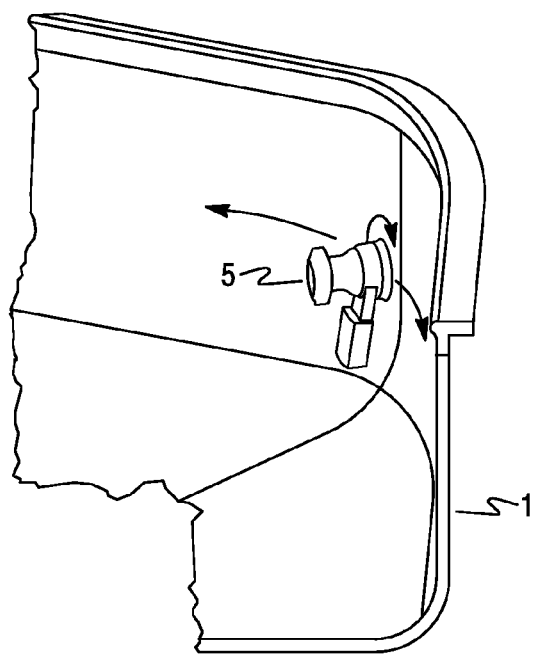
FIG. 3 is a schematic showing the final aggregate exposing sanding step of the process.

During the trowelling step, and before the mixture has been allowed to set, seeding of colored or other performance aggregate can occur. The seeding (FIG. 2) can be done by hand or machine 6 to create a desired effect and/or density. The seeding can be emphasized along underwater features, i.e., step edges, ladder or shallow areas, etc., or can include predetermined designs like Trademarks or mural effects. By seeding only the upper eventually exposed portions of the plaster mixture, great savings can be achieved in the overall cost of aggregate used to create a given effect.

At this point, following a $1/2$ to 2 hour initial set of the surface, a chemical horizontal surface retarder (a suitable one is sold under the label "Delay S") is optionally sprayed onto the trowelled surface to slow the final setting of the surface. A plastic cover can be placed over the surface treated with the retarder. Once the mixture has been allowed to set fully, at least 10-20 hours, preferably 1-2 days, the surface is power-washed and sanded 5 repeatedly (using water injected sanders relying on diamond grit 80 or polymer pad 50-150 grit sanding surfaces) until the desired surface color, aggregate exposure, and texture has been achieved. The prior addition of the horizontal retarder greatly speeds the sanding process by making the cement and aggregate surface much more susceptible to the sanding and washing steps that follow initial curing. The retarder cannot be applied immediately following the trowelling but instead must be applied after an initial set has begun in the surface in the $1/2$ to 2 hour period following the completion of the trowelling. If the retarder is applied too soon, the top surface will not become hard enough for sanding; if applied too late, the retarder will not aid the sanding step to be taken later. Likewise, beginning the sanding too soon following the retarder application will result in poor surface performance. A full 12-24 hour set is necessary.

A smooth-to-the-touch surface is most desirable from an appearance and use perspective. That is, a smooth-to-the-touch finish appears the most attractive when the pool is water filled and the surface being smooth provides the least irritation to pool users once complete. When the sanding and washing is complete, the pool is filled with water, chemical treatment added as necessary, and brushed until no dust appears from the sanded surfaces.

Certain pool water and finish combinations may yield an undesirable precipitation, efflorescence, discoloration, or molting through the newly finished surface in the weeks and months following initial filling of the pool. These conditions usually exist owing to the high dissolved chemical and mineral content of the available water used to fill the pool post-finishing. If such a water related issue can be anticipated, a treatment using bicarbonate of soda mixed at a ratio of 50-100 lbs bicarbonate of soda into 30-50 gallons of water, mixed by agitation, and further dissolved into the pool filling water (make-up water) will be effective in treating 60-70% of such problems. In instances where the finish is still molting or showing discoloration, etc, following initial brushing and bicarbonate filling treatment, the addition of an effective amount of sulfanic acid to treat excess an remaining excess alkalinity will eliminate the problem and bring ph level to within an acceptable range initially of 5.5-6.5 (to eliminate the discoloration, etc.), and then adjusted to 6.8-7.2 on an ongoing basis.

The mixture used in the present method may be colored by the choice of marble aggregate, cement, and pool sand. Certain standard colors may be provided, but almost any color may be achieved with sufficient patience and ranges of aggregate colors, cements, and sands. Similarly, the surface effects created using the seeded performance aggregates added during the trowelling step are limited only by the imagination of the artisan. Such treatments can include 3-D effects with multiple thin layers successively applied, alternating layers of glow-in-the-dark and non-light sensitive aggregates, templates using pre-determined assigned colors in specified areas, etc. These effects can be purely decorative, can be safety oriented (marking hazards, edges, steps, ladders, shallows, etc.) or can be a combination.

The use of sanding in combination with the glow type aggregate is advantageous to the extent that sanding cuts through the aggregate and increases the exposed surface thereof. The increase in exposed surface enables greater light absorption and consequently increases the glow effect after sun down. This increased effect enables the use of less of the expensive glowing aggregate for a given amount of glow-in-the-dark effect.

The invention claimed is:

1. A method of surfacing the inner surfaces of a gunite swimming pool shell, comprising the steps of:
    providing a gunite swimming pool shell prepared to receive a surface treatment;
    mixing, for approximately 5-7 minutes, a combination of cement and $\frac{1}{16}$-$\frac{1}{4}$ inch marble aggregate, in a ratio of about 1 to 1-2 parts respectively, and swimming pool sand at about $\frac{1}{4}$ part with sufficient potable water to create a smooth textured mixture;
    adding a plasticizer to said mixture;
    pumping said mixture to said gunite shell;
    applying said mixture from said pump to said gunite shell;
    trowelling said mixture onto said gunite shell to form a still soft trowelled surface;
    seeding said trowelled surface with a pre-selected aggregate to create a desired surface effect;
    continuing to trowel said surface until firm to form a hardened surface having seeded pre-selected aggregate buried therein;
    allowing said surface to cure for $\frac{1}{2}$ to 2 hours;
    spraying said surface with a chemical surface retarder and covering said surface using plastic sheeting;
    allowing said mixture to set for at least 12 hours; and, thereafter,
    alternately sanding and power washing said surface and cutting said pre-selected aggregate open until a desired degree of surface smoothness and exposure of said surface effect has been achieved.

2. A method as in claim 1, further comprising:
    filling said pool;
    treating said water; and, brushing said surface until no dust is produced.

3. A method as in claim 1, wherein:
    said trowelling step includes about 4 passes with a hand trowel.

4. A method as in claim 2, wherein:
    said treating step includes adding an effective amount of sulfanic acid to counteract excessive alkalinity and reduce discoloration of said faade.

5. A method as in claim 2, wherein:
    said filling step includes adding a mixture of bicarbonate of soda and water so as to reduce discoloration of said surface.

6. A method as in claim 1, wherein:
    seeding step uses a glow-in-the-dark aggregate of varying sizes so as to create a 3-D effect from multi-layers of glow in the dark aggregate.

7. A method as in claim 1, wherein:
    said sanding step cuts said glow in the dark aggregate and thereby increase the surface area of said glow in the dark aggregate and increase light absorption thereby.

8. A method of surfacing the inner surfaces of a gunite swimming pool shell, comprising the steps of:
    providing a gunite swimming pool shell prepared to receive a surface treatment;
    mixing, for approximately 5-7 minutes, a combination of cement and $\frac{1}{16}$-$\frac{4}{16}$ inch marble aggregate, in a ratio of about 1 to 1-2 parts respectively, and swimming pool sand at about $\frac{1}{4}$ part with sufficient potable water to create a smooth textured mixture;
    adding a plasticizer to said mixture to make the mixture more pliant;
    pumping said mixture to said gunite shell;
    applying said mixture from said pump to said gunite shell;
    trowelling said mixture onto said gunite shell to form a still soft trowelled surface;
    seeding said trowelled surface with a pre-selected aggregate up to $\frac{1}{4}$ inch in size to create a desired surface effect;
    continuing to trowel said surface until firm to form a hardened surface having seeded pre-selected aggregate buried therein;
    allowing said mixture to set for $\frac{1}{2}$ to 2 hours; spraying said surface with a chemical surface retarder;
    allowing said surface to set for a further 12 hours;
    and, thereafter, alternately sanding and power washing said surface until a desired degree of surface smoothness and exposure of said surface effect has been achieved.

* * * * *